Patented Dec. 7, 1937

2,101,792

UNITED STATES PATENT OFFICE 2,101,792

ALKYD RESIN COATING AND COMPOSITION OF IMPROVED ALKALI RESISTANCE AND PROCESS OF MAKING SAME

Carleton Ellis, Montclair, N. J., assignor to Ellis-Foster Company, a corporation of New Jersey No Drawing. Application November 19, 1936, Serial No. 111,741

16 Claims. (Cl. 134—26)

This invention relates to alkyd resin compositions and coatings including paints, varnishes, lacquers and the like.

One of the principal objects of this invention is the production of coating compositions, preferably containing a highly reacted or a gelled alkyd resin comprising an unsaturated fatty oil or oil acids, having an improved resistance to alkali and water.

Another object of the invention is to provide a method for producing resinous compositions and coatings of this character which is simple, easily carried out and controlled, and economical in operation.

In making drying alkyd resins the polyhydric alcohol is commonly esterified with a mixture of polybasic organic acid and drying oil fatty acids to a relatively low acid number, but to avoid possible gelation and resulting insolubility of the resinified mass the reaction is stopped well short of the stage where objectionable polymerization begins. The resistance to alkali and water of coatings from such resins is not as high as might be desired.

It has been found that resins of this type reacted to the stage where a small degree of polymerization has taken place but are still soluble in common organic solvents give coatings with improved resistance to alkali and water. In general the greater the degree of polymerization as indicated by gelation or incipient gelation in the resinous mass the greater the resistance of the resulting coating to alkali and water. However, when polymerization has proceeded to substantial proportions the resinous product is no longer soluble in organic liquids, but it has been found that even the gelled resins dissolve in fused solid or semi-solid solvents such as rosin or rosin esters to give homogeneous products which are soluble in many of the common varnish and lacquer solvents. Solutions of these homogeneous products dry rapidly to clear, tough and hard films which are much more resistant to alkali and water than the slightly polymerized resinous products referred to above. The rate of drying is accelerated by addition of drier compounds. By incorporating basic or neutral pigments such as iron oxide, ocher, titanium oxide, Titanox and carbon black suitable alkali resisting paints are obtained.

Instead of first reacting the polyhydric alcohol, polybasic acid and fatty oil acids to the gel stage and dissolving the resulting gel in fused rosin ester, ester gum (glycerol ester of rosin) or similar solid or semi-solid solvents and the like may be added to the original mix. In this case the fused solvent delays gelation of the mixture so that polymerization of the alkyd resin constituent may proceed to the stage where the constituent without the added solid solvent would normally gel. This product is soluble in varnish and lacquer solvents without further treatment and gives coatings which have about the same alkali resistance as that of a corresponding composition made by the two-step process indicated above.

In cases where resin acids such as rosin are used in a composition it is, in general, desirable in a later stage to esterify the acids present with glycerol or other alcohols.

It is believed that the increased alkali and water resistance of these compositions is due to polymerization of the oil or alkyd resin constituent or both and not entirely to more complete esterification of the components. For example, on heating a mixture of glycerol, phthalic anhydride and linseed oil acids containing 50 per cent of the oil acids at 250° C., there was a small and uniform increase in relative viscosity, as esterification proceeded, from an original value of 3 seconds to 5 seconds at the end of 9 hours. At this point the viscosity began to increase more rapidly and after 10 hours reached 6 seconds, after 11 hours 10 seconds, and after 12 hours 50 seconds. The acid number dropped rapidly to 4½ after 4 hours and for the next 5 hours there was a gradual decrease to 3. This it should be noted is the point at which the viscosity began to increase more rapidly which is ascribed to the presence of much larger molecules formed by polymerization. During the next two hours, while the viscosity was increasing rapidly, the acid number remained constant and during the last hour of heating (11 to 12) in which period the viscosity increased from 10 to 50 seconds, the acid number actually increased to 4 units.

The following specific examples are given to illustrate the manner of carrying out this invention and the character of the products derived therefrom. Glycerol and phthalic anhydride are the most available polyhydric alcohol and polybasic acid for this invention at the present time, although other polyhydric alcohols and polybasic acids may be used to advantage in some cases. All proportions are given as parts by weight.

*Example 1.*—A mixture of 92 parts glycerol, 175 parts phthalic anhydride and 178 parts linseed oil fatty acids was heated at 250° C. The viscosity of the resinous mass as the temperature reached 250° C. was 3½ seconds (Sample 1). After 4 hours at 250° C. the viscosity was 15 seconds and a specimen designated Sample 2 was removed. A specimen designated Sample 3 was removed after 5 hours and was found to be a soft gel.

Fifty per cent toluol solutions of these samples were prepared and 1% lead and cobalt naphthenate drier was added to each. A large proportion of Sample 3 was insoluble. Films on glass were dried for 24 hours and placed in 2% aqueous sodium hydroxide solution. Films from Samples 1 and 3 began to whiten in 10 minutes. After 30 minutes film 2 was clear and firm and newsprint could be read through it, while film 1 was rough and opaque and the letters of the newspaper could not be distinguished therethrough. The film from the soluble portion of Sample 3 softened and disintegrated after 30 minutes in the alkaline solution.

*Example 2.*—A mixture of 92 parts glycerol, 175 parts phthalic anhydride and 178 parts linseed oil fatty acids was heated at 230° C. for about 7 hours until it was completely gelled. Only a small proportion of the product was soluble in toluol. (a) Ten parts of the gelled resin and 30 parts glycerol ester of rosin were heated at 250° C. for ½ hour until solution was effected. The homogeneous product was dissolved in 40 parts xylol and 1% lead and cobalt naphthenate drier solution was added. (b) A mixture of 15 parts of the gelled resin and 30 parts ester gum was heated at 250° C. for about ½ hour until it became homogeneous. The product was dissolved in 45 parts xylol and 1% lead and cobalt naphthenates drier solution was added. (c) Twenty parts gelled resin was heated with 20 parts ester gum at 250° C. for ¾ hour and a homogeneous product resulted. This material was dissolved in 40 parts xylol and 1% lead and cobalt naphthenates drier solution was added. (d) Another 20 parts of the gelled resin was heated with 10 parts ester gum at 250° C. until solution was effected. A homogeneous product was thus obtained which was dissolved in 30 parts xylol and 1% lead and cobalt naphthenates drier solution was added. (e) A mixture of 30 parts gelled resin and 10 parts ester gum was heated at 250–280° C. for 1 hour until a homogeneous mass resulted. The product was dissolved in 40 parts xylol and 1% lead and cobalt naphthenates drier solution was added.

Films from each of the above solutions, (a), (b), (c), (d) and (e), on glass were dried for 24 hours and placed in a 5% aqueous sodium hydroxide solution at room temperature. Film (e) from 3 parts gel and 1 part ester gum began to whiten in 3 hours and film (d) from 2 parts gel and 1 part ester gum began to whiten in 5 hours. After remaining in sodium hydroxide solution for 24 hours films (d) and (e) were soft and opaque, and films (a), (b) and (c) were clear and firm. After 48 hours in sodium hydroxide solution film (e) had disintegrated; film (d) was soft, white and opaque; film (c) from 1 part gel and 1 part ester gum had a slightly whitish appearance, but was firm and tough; films (a) and (b) were clear and firm, but (a) from 1 part gel and 3 parts ester gum was brittle and had a tendency to flake off the glass.

*Example 3.*—A mixture of 92 parts glycerol, 175 parts phthalic anhydride and 178 parts perilla oil fatty acids was heated at 230° C. for 6 hours until a gelled mass resulted. Twenty parts of this gelled resin and 40 parts ester gum were heated at 250° C. for ¾ hour until a homogeneous mass resulted. This product was dissolved in 60 parts toluol and 1.2 parts of a 33⅓% lead and cobalt naphthenates solution were added. A film on glass was dried for 24 hours and placed in a 5% aqueous sodium hydroxide solution at room temperature. After remaining in the alkali for 72 hours the film was clear, smooth and firm.

*Example 4.*—Ninety-two parts glycerol, 175 parts phthalic anhydride and 178 parts oiticica oil fatty acids were heated at 230° C. The mass gelled rather suddenly after 1 hour giving a tough, porous, non-sticky mass. Twenty parts of this material was heated with 40 parts ester gum at 250–280° C. for 1 hour until the gel dissolved. The product was dissolved in a mixture of 30 parts toluol and 30 parts xylol and 1.2 parts of a 33⅓% lead and cobalt naphthenates drier solution were added. A film on glass was dried for 24 hours and placed in a 5% aqueous sodium hydroxide solution at room temperature. After remaining in the sodium hydroxide solution for 72 hours the film was clear, smooth and firm.

*Example 5.*—A mixture of 92 parts glycerol, 157 parts phthalic anhydride and 249 parts linseed oil acids was gelled by heating at 250° C. for about 13 hours and 20 parts of the gel were heated with 20 parts ester gum at 200° C. for about 2 hours until a homogeneous mass resulted. The product was dissolved in 40 parts of an equal mixture of petroleum hydrocarbons of the V. M. and P. type and toluol and 0.8 part of a 33⅓% solution of lead naphthenate and cobalt naphthenate was added. A film on glass, dried for 24 hours, was placed in a 5% aqueous sodium hydroxide solution at room temperature. After 48 hours the film was clear, smooth and firm.

*Example 6.*—A mixture of 46 parts glycerol, 95 parts phthalic anhydride and 60 parts soy bean oil acids was heated at 230° C. for 4 hours until it gelled. Twenty parts of this gel was heated with 20 parts ester gum at 230° C. for 1 hour until solution was effected. This product was dissolved in 40 parts toluol and 0.8 part of a 33⅓% solution of lead and cobalt naphthenates was added.

A film on glass dried for 24 hours was placed in a 5% aqueous sodium hydroxide solution at room temperature. After 24 hours the film was somewhat white, but firm and smooth.

*Example 7.*—Twenty parts of a gelled glycerol, phthalic anhydride, linseed oil acids resin, containing 75% of the oil acids, was fused with 40 parts ester gum at 250° C. for about 1 hour until a homogeneous mass resulted. This product was dissolved in 60 parts petroleum hydrocarbon distillate and 1% lead and cobalt naphthenates (based on oil component) was added. A film on glass dried for 24 hours was placed in 5% aqueous sodium hydroxide solution at room temperature. After 48 hours the film was somewhat white, but smooth and firm.

*Example 8.*—A mixture of 92 parts glycerol, 175 parts phthalic anhydride, 178 parts linseed oil fatty acids and 445 parts ester gum was heated at 230° C. for 7½ hours. (From Example 2 it will be seen that this is equivalent to the time required to gel 92 parts glycerol, 175 parts phthalic anhydride and 178 parts linseed oil fatty acids and dissolve 20 parts of the gel in 20 parts ester gum.) There was no evidence of gel formation. Forty parts of this resin were dissolved in 40 parts toluol and 0.8 part of a 33⅓% solution of lead naphthenate and cobalt naphthenate was added. A film on glass dried for 24 hours was placed in a 5% sodium hydroxide solution at room temperature. After 72 hours in the sodium hydroxide solution the film was clear, smooth and firm.

*Example 9.*—A mixture of 92 parts glycerol, 190 parts phthalic anhydride, 120 parts soy bean oil acids and 120 parts tung oil was heated at 230° C. until a gelled mass resulted. Twenty parts of this gel and 40 parts ester gum were heated at 260–280° C. for about 1 hour until solution was effected. The homogeneous product was dissolved in 60 parts toluol and 1% lead and cobalt naphthenate (based on alkyd component) was added. A film on glass dried for 24 hours was placed in a 5% aqueous sodium hydroxide solution at room temperature. After 48 hours in the alkali the film was clear, smooth and firm.

*Example 10.*—A mixture of 92 parts glycerol, 175 parts phthalic anhydride, 89 parts perilla oil acids and 89 parts soy bean oil acids was heated at 230° C. for about 6 hours until the mass gelled. Twenty parts of this gelled resin and 40 parts ester gum were heated at 240° C. for ¾ hour until a homogeneous mass resulted. The product was dissolved in 60 parts petroleum hydrocarbon distillate and 1.2 parts of a 33⅓% lead and cobalt naphthenates solution was added. A film on glass dried for 24 hours was placed in a 5% aqueous sodium hydroxide solution at room temperature. After remaining in the alkaline solution for 48 hours the film was clear, smooth and firm.

*Example 11.*—Ten parts gelled resin as in Example 5 were heated with 10 parts ester gum until a homogeneous mass resulted. This product was dissolved in 20 parts of an equal mixture of toluol and xylol and ground in a paint mill with 25 parts iron oxide pigment. The mixture was thinned to brushing consistency and 1% naphthenate drier solution (based on alkyd component) was added. Coatings from this composition were very resistant to alkalies.

*Example 12.*—A mixture of 92 parts glycerol, 175 parts phthalic anhydride, 60 parts linseed oil acids, 60 parts perilla oil acids and 60 parts soy bean oil acids was heated at 230° C. for about 6 hours until a gel resulted. Forty parts of this gelled resin was heated with 40 parts ester gum at 250° C. for about 2 hours until a homogeneous mass resulted. The product was dissolved in 80 parts petroleum hydrocarbons and 1.6 parts 33⅓% lead and cobalt naphthenates drier solution was added. A film on glass dried for 24 hours was placed in a 5% aqueous sodium hydroxide solution at room temperature. After 24 hours in the sodium hydroxide solution the film had a few white spots, but was firm.

*Example 13.*—Twenty parts of a gelled resin prepared from 92 parts glycerol, 175 parts phthalic anhydride and 178 parts linseed oil fatty acids were heated at 250° C. with 40 parts diethylene glycol ester of rosin for ¾ hour until the gel dissolved. The homogeneous product was dissolved in 60 parts toluol and 1.2 parts 33⅓% naphthenate drier solution was added. A film on glass was dried for 24 hours and placed in a 5% aqueous sodium hydroxide solution at room temperature. After 48 hours in the alkaline solution the film was somewhat white, but firm.

*Example 14.*—A mixture of 92 parts glycerol, 175 parts phthalic anhydride and 178 parts soy bean oil acids was heated at 230° C. for about 7 hours until gelation occurred. Forty parts of the gelled resin and 40 parts ethylene glycol ester of rosin were heated at 250° C. for about 1 hour until a homogeneous mass resulted. The product was dissolved in 80 parts petroleum hydrocarbons and 1 part of a 33⅓% solution of lead naphthenate and cobalt naphthenate was added. A film on glass was dried for 24 hours and placed in a 5% aqueous sodium hydroxide solution at room temperature. After 24 hours in the alkaline solution the film had whitened and softened to a slight extent.

*Example 15.*—A mixture of 138 parts polyglycerol, 175 parts phthalic anhydride and 178 parts linseed oil fatty acids was heated at 230° C. for about 6 hours until it gelled. Twenty parts of the gelled resin and 40 parts ester gum were heated at 250° C. for about 1 hour until a homogeneous mass resulted. The product was dissolved in 60 parts xylol and 1% naphthenates of lead and cobalt (based on alkyd component) was added. A film of glass was dried for 24 hours and placed in a 5% aqueous sodium hydroxide solution at room temperature. After 48 hours in the alkaline solution the film had a few white spots, but was firm and adhered well to the glass.

*Example 16.*—A mixture of 92 parts glycerol, 140 parts phthalic anhydride, 28 parts maleic acid and 178 parts soy bean oil fatty acids was heated at 230° C. for about 2 hours until a gel resulted. Fifty parts of the gelled resin was heated with 50 parts ester gum at 250° C. for 1 hour and finally to 300° C. To this fused product were added 100 parts xylol and 2 parts 33⅓% solution of lead naphthenate and cobalt naphthenate. (A very small amount of the fused product did not dissolve.) A film on glass was air-dried for 2 days and placed in a 5% aqueous sodium hydroxide solution at room temperature. After 24 hours in the alkaline solution the film had whitened and softened to a slight extent.

The foregoing examples are presented for clearness of understanding only and do not attempt to give all possible combinations of constituents. No unnecessary limitations should be drawn therefrom. In general unsaturated fatty acids are preferred in the alkyd resin component, although mixtures of saturated and unsaturated fatty acids, mixtures of two or more unsaturated fatty acids, mixtures of fatty oil and fatty acids, or combinations of these may be employed. It is evident from Example 2 that homogeneous products are obtained from various proportions of gelled resin and ester gum. For certain purposes proportions outside this limit may be desirable.

The alkyd resin component may be made by various direct and indirect methods including one or more steps. In certain cases it may be desirable to prepare the resin directly from the fatty oil employing various methods of sensitization.

Ester gum is the most available rosin ester for this invention at the present time, although various other esters of rosin or other acid resins and polyhydric alcohols in general or mixtures of these may be used, so long as they serve as solid or semi-solid solvents of normally substantially or incipiently gelled synthetic resin stock.

Lighter colored products are obtained by carrying out the reactions and procedures in an inert atmosphere instead of air.

What I claim is:

1. A homogeneous resinous composition of improved alkali resistance comprising the fused products of gelled fatty oil acids modified alkyd resin and rosin ester.

2. A homogeneous resinous composition of improved alkali resistance comprising the fused products of gelled unsaturated fatty oil acids modified alkyd resin and rosin ester.

3. A homogeneous resinous composition of improved alkali resistance comprising the fused products of gelled drying oil acids modified alkyd resin and rosin ester.

4. A homogeneous resinous composition of improved alkali resistance comprising the fused products of gelled glycerol-phthalic anhydride-drying oil acids resin and glycerol ester of rosin.

5. A homogeneous resinous composition of improved alkali resistance comprising the fused products of gelled glycerol-phthalic anhydride-semi-drying oil acids resin and glycerol ester of rosin.

6. A homogeneous resinous composition of improved alkali resistance comprising the fused products of gelled drying alkyd resin and glycerol ester of rosin.

7. The process of producing a homogeneous resinous composition of improved alkali resistance comprising heating gelled fatty oil acids modified alkyd resin and rosin ester at a temperature above the melting point of the rosin ester.

8. The process of producing a homogeneous resinous composition of improved alkali resistance comprising heating gelled unsaturated fatty oil acids modified alkyd resin and rosin ester at a temperature above the melting point of rosin ester.

9. The process of producing a homogeneous resinous composition of improved alkali resistance comprising heating gelled drying oil acids modified alkyd resin and rosin ester at a temperature above the melting point of the rosin ester.

10. The process of producing a homogeneous resinous composition of improved alkali resistance comprising heating gelled glycerol-phthalic anhydride-drying oil acids resin and glycerol ester of rosin at a temperature above the melting point of the glycerol ester of rosin.

11. The process of producing a homogeneous resinous composition of improved alkali resistance comprising heating gelled semi-drying oil acids modified alkyd resin and rosin ester at a temperature above the melting point of rosin ester.

12. The process of producing a homogeneous resinous composition of improved alkali resistance comprising heating gelled glycerol-phthalic anhydride-fatty oil acids resin and glycerol ester of rosin at a temperature above the melting point of the glycerol ester of rosin.

13. A resinous coating composition of improved alkali resistance comprising a solution in an organic solvent of the homogeneous fused products of gelled fatty oil acids modified alkyd resin and rosin ester.

14. A resinous coating composition of improved alkali resistance comprising a solution in an organic solvent of the homogeneous fused products of a gelled drying oil acids modified alkyd resin and rosin ester.

15. A resinous coating composition of improved alkali resistance comprising a solution in an organic solvent of the homogeneous fused products of a gelled glycerol-phthalic anhydride-drying oil acids resin and glycerol ester of rosin.

16. A resinous coating composition of improved alkali resistance comprising the solution in an organic solvent of the homogeneous fused products of a gelled glycerol-phthalic anhydride-fatty oil acids resin and glycerol ester of rosin.

CARLETON ELLIS.